(12) United States Patent
Hayes

(10) Patent No.: US 11,804,729 B2
(45) Date of Patent: *Oct. 31, 2023

(54) TRANSFER SWITCH POWER SOURCE SELECTION SYSTEMS AND METHODS

(71) Applicant: ASCO Power Technologies, L.P., Florham Park, NJ (US)

(72) Inventor: John E. Hayes, Hardwick, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,091

(22) Filed: Jun. 25, 2021

(65) Prior Publication Data

US 2021/0320520 A1    Oct. 14, 2021

Related U.S. Application Data

(63) Continuation of application No. 16/879,820, filed on May 21, 2020, now Pat. No. 11,101,687, which is a continuation of application No. 15/205,451, filed on Jul. 8, 2016, now Pat. No. 10,756,565.

(51) Int. Cl.
*H02J 9/00* (2006.01)
*H02J 9/06* (2006.01)
*G06F 1/30* (2006.01)

(52) U.S. Cl.
CPC ............... *H02J 9/061* (2013.01); *G06F 1/30* (2013.01)

(58) Field of Classification Search
CPC .................................. H02J 9/061; G06F 1/30
See application file for complete search history.

(56) References Cited

U.S. PATENT DOCUMENTS

| | | | |
|---|---|---|---|
| 5,783,964 A | 7/1998 | Eitan | |
| 6,768,225 B2 | 7/2004 | Chang et al. | |
| 9,112,376 B2 | 8/2015 | Wang et al. | |
| 9,276,408 B2 * | 3/2016 | Lathrop | H02J 3/381 |
| 9,588,506 B1 * | 3/2017 | Clayton | H04B 7/145 |
| 9,766,670 B1 * | 9/2017 | Czamara | H02J 3/14 |
| 9,871,410 B2 | 1/2018 | Lee | |
| 2002/0130556 A1 | 9/2002 | Hohri | |

(Continued)

FOREIGN PATENT DOCUMENTS

CN        201733131 U  *  2/2011    ............... H02J 9/06

*Primary Examiner* — Adi Amrany
(74) *Attorney, Agent, or Firm* — Locke Lord LLP

(57) ABSTRACT

According to aspects of the disclosure, a method and system are provided for transferring a load between a primary power source and a secondary power source. In accordance with the disclosure, a method of transferring a load between a first power source and a second power source includes analyzing a plurality of power sources to identify one or more power sources providing a power greater than a threshold value. The method also includes selecting a power source from the identified one or more power sources providing power greater than the threshold value. The method further includes connecting the selected power source to a transfer mechanism. The method still further includes actuating the transfer mechanism, using power provided to the transfer mechanism by the selected power source, to transfer the load from a connection with the first power source to a connection with the second power source.

21 Claims, 4 Drawing Sheets

(56) References Cited

U.S. PATENT DOCUMENTS

| | | |
|---|---|---|
| 2008/0054722 A1 | 3/2008 | Phelps et al. |
| 2010/0141038 A1 | 6/2010 | Chapel et al. |
| 2010/0141040 A1 | 6/2010 | Chapel et al. |
| 2012/0229191 A1* | 9/2012 | Galm .................. H03K 17/735 327/427 |
| 2014/0001861 A1 | 1/2014 | Mann et al. |
| 2015/0214779 A1* | 7/2015 | Tomassi ................. H02J 9/061 307/65 |
| 2016/0156197 A1* | 6/2016 | Batzler .................... H02J 3/14 307/23 |
| 2016/0197517 A1* | 7/2016 | Bundschuh ............... H02J 9/06 307/64 |

* cited by examiner

TRANSFER SWITCH POWER SOURCE SELECTION SYSTEMS AND METHODS

PRIORITY

The present U.S. patent application is a continuation of copending U.S. patent application Ser. No. 16/879,820, filed May 21, 2020, which is a continuation of U.S. patent application Ser. No. 15/205,451, filed Jul. 8, 2016, now U.S. Pat. No. 10,756,565 dated Aug. 25, 2020, of which is herein expressly incorporated by reference.

BACKGROUND

Unless otherwise indicated herein, the materials described in this section are not prior art to the claims in this application and are not admitted to be prior art by inclusion in this section.

Various applications require a nearly constant supply of reliable electrical power to operate effectively. For example, hospitals may require a constant and reliable supply of electricity to ensure medical equipment in operating rooms and the like function when needed. Further, food retailers such as supermarkets and grocery stores may require a constant and reliable supply of electricity to properly operate refrigeration systems associated with display cases and freezers to prevent food spoilage.

While utility companies generally provide electrical power consistently and reliably, such power is sometimes interrupted due to inclement weather, unforeseen accidents, or maintenance. Electrical power consumers seeking to mitigate or avoid even minor interruptions in their power supply often rely on generators and other backup systems to supply electrical power during periods when electrical service from a utility company is interrupted. Transfer switches enable these consumers to switch between a primary electrical source (e.g., from a utility company) and a secondary electrical source (e.g., a generator or other backup system) when one source becomes unreliable or requires maintenance.

Transfer switches may be manual transfer switches where, for example, an operator throws a switch to transfer power from one source to another. Additionally or alternatively, transfer switches may be automatic transfer switches where, for example, the switch automatically senses when a source has lost or gained power and responsively transfers power from one source to another. In one implementation, to transfer power between sources, the transfer switch may initiate a control sequence in which the transfer switch automatically starts a standby generator and then connects the standby generator to the load. The transfer switch may also automatically reconnect the utility power to the load if utility power is reestablished.

A bypass transfer switch may be used for applications where maintenance, inspection, and/or testing are performed while maintaining continuous power to the load. The bypass feature typically includes a secondary electro-mechanical switching device (bypass switch) that can route power to the load in a manner that circumvents a main transfer switch. This bypass feature allows, for example, (i) switch redundancy if a problem arises with the main transfer switch, (ii) exercising the main transfer switch without a load connection, and (iii) isolation for maintenance of the main transfer switch while ensuring the continuity of power to the load or loads. Any reference to transfer switch herein is meant to be non-limiting and broadly encompass any type of transfer switch.

SUMMARY

In an example, a method of transferring a load between a first power source and a second power source includes analyzing a plurality of power sources to identify one or more power sources providing a power greater than a threshold value. The method also includes selecting a power source from the identified one or more power sources providing power greater than the threshold value. The method further includes connecting the selected power source to a transfer mechanism. The method still further includes actuating the transfer mechanism, using power provided to the transfer mechanism by the selected power source, to transfer the load from a connection with the first power source to a connection with the second power source.

In another example, a transfer switch for selectively supplying power from a plurality of power sources to an electrical load includes a power source analyzer, a transfer mechanism, and a source select module. The power source analyzer is configured to analyze a plurality of power sources and determine power data based on the analysis of each power source. The transfer mechanism is configured to selectively connect each of the plurality of power sources to the load one power source at a time. The source select module is connected to the power source analyzer and receives the power data from the power source analyzer. The source select module is configured to: (i) identify one or more of the plurality of power sources providing a power greater than a threshold value, (ii) select a power source from the identified one or more power sources providing power greater than the threshold value, and (iii) cause the selected power source to be connected to the transfer mechanism such that the transfer mechanism is powered by the selected power source when the transfer mechanism transfers a load from a connection with a first power source of the plurality of power sources to a connection with a second power source of the plurality of power sources.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
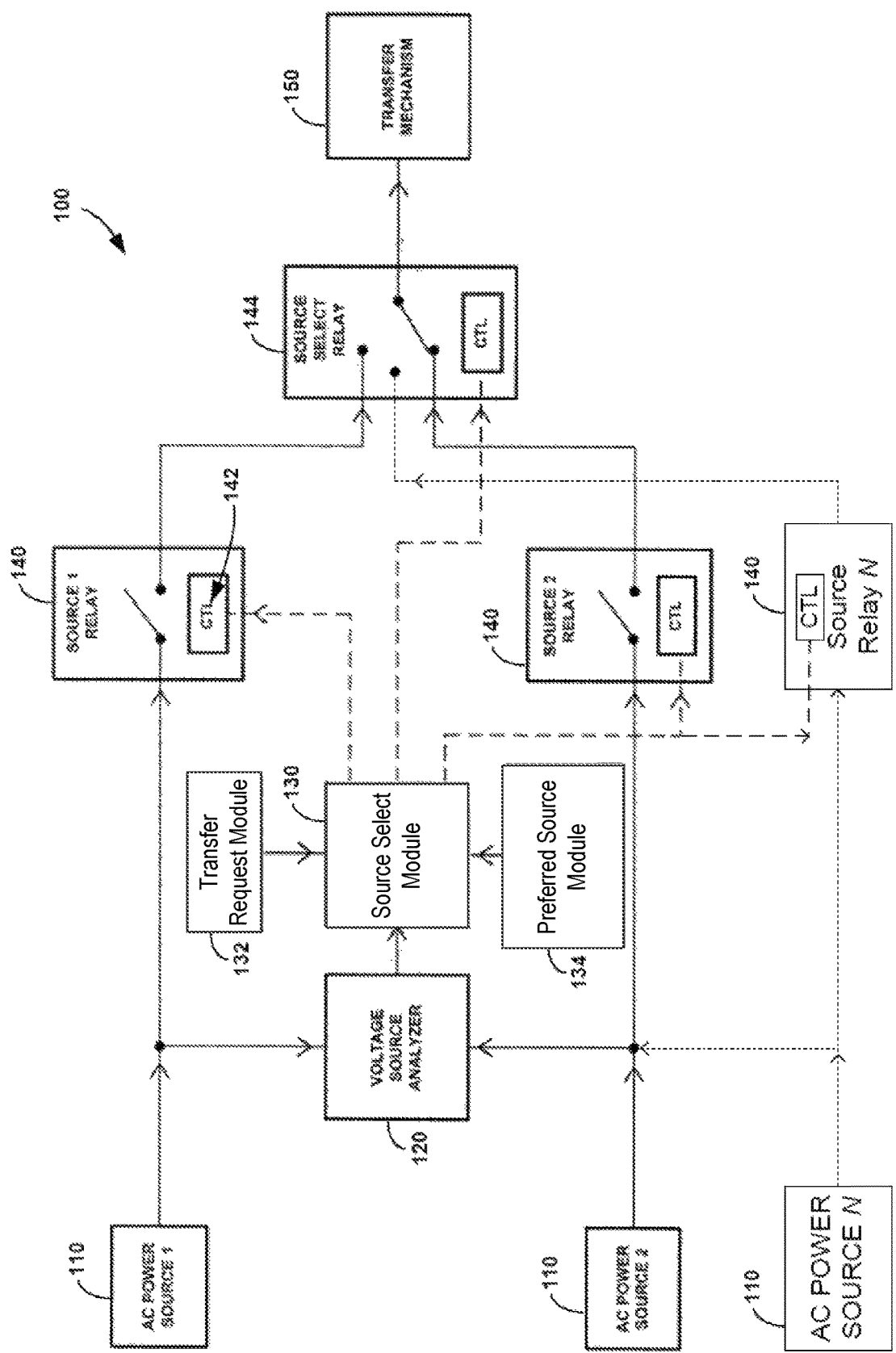
FIG. 1 is a block diagram representing an example transfer switch device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In line with the discussion above, one function of an automatic transfer switch is to transfer a system load from a first power source to a second power source when the first power source experiences a power outage or perhaps another power fault condition (e.g., an unstable power condition). By transferring power from the first power source to the second power source, the automatic transfer switch allows the load to continue receiving power in an uninterrupted or near constant manner.

Other functions of an automatic transfer switch include load shedding and maintenance modes of operation. For example, if an overload condition occurs, it may be beneficial to shed some loads to allow for other loads to remain powered. To shed a load, the automatic transfer switch can transfer the load from an active power source (i.e., a live power source) to an inactive power source (i.e., a dead power source). Similarly, the automatic transfer switch can transfer a load from an active power source to an inactive power source to facilitate a maintenance mode of operation.

In general, an automatic transfer switch includes a transfer mechanism, which is operable to carry out the transfer of the load between different power sources. In many systems, the transfer mechanism itself requires power to operate and, thus, transfer the load between sources. As an example, the transfer mechanism can include a solenoid, which requires power to switch one or more contacts between different electrical connections to the power sources. In one approach, the transfer mechanism is powered by the power source to which the load is being transferred. This approach works well in a scenario in which the power source from which the load is being transferred is no longer active (e.g., experiences an outage) and, thus, cannot provide enough power to operate the transfer mechanism.

In other scenarios, however, powering the transfer mechanism using the power source to which the load is being transferred may not be beneficial (or even possible). In particular, for example, in scenarios in which the load is being transferred to an inactive power source for load shedding and/or maintenance operations it may undesirable or not possible to power the transfer mechanism with the power source to which the load is being transferred.

Disclosed herein is a transfer switch and method that manages power source selection for powering a transfer mechanism. In particular, the present disclosure provides for a transfer switch that analyzes power signals provided by multiple power sources to determine which power source(s) have at least a threshold level of power for operating the transfer mechanism. The transfer switch further selects one of the power sources based at least in part on the analysis of the power signals and then connects the selected power source to the transfer mechanism.

In examples, the transfer switch can selectively power the transfer mechanism by (i) the power source from which the load is to be transferred or (ii) the power source to which the load is to be transferred based on the analysis of power signals provided by the power sources. As such, the transfer switch of the present disclosure can advantageously transfer a load from an inactive power source to an active power source and/or transfer the load from an active power source to an inactive power source. This may beneficially facilitate, among other things, operating the transfer switch for power continuity, load shedding, and/or maintenance purposes.

According to additional aspects of the disclosure, the transfer switch can protect the power sources from source to source arc-through and short circuit conditions. In an example, the transfer switch can protect the power sources from such conditions by employing two stages of relays. In an implementation, the second stage of the relays can be a double throw double pole relay to protect against shorting the power sources. As a result, even if there is a failure that causes the first stage of relays to pass-through power from multiple power sources at one time, the second stage relay can only connect to one of the power sources at a time. Additionally, for example, each of the first stage of relays can have a relatively large contact gap to inhibit or prevent arc-through. The transfer switch of the present disclosure may thus facilitate safely transferring a load between power sources using a selected one of multiple possible power sources based on operating conditions at the time of the transfer.

FIG. 1 is a block diagram representing an example transfer switch system 100 in accordance with aspects of the present disclosure. As shown in FIG. 1, the transfer switch 100 includes a plurality of power sources 110, a voltage source analyzer 120, a source select module 130, a transfer request module 132, a preferred source module 134, one or more first stage relays 140 with controllers 142, a second stage relay 144, and a transfer mechanism 150.

In general, the power sources 110 can each provide power in the form of an electrical signal. In particular, for example, the electrical signal can be an alternating current (AC) voltage signal. Example power sources 110 include a power utility (e.g., the electrical grid), a generator (e.g., a diesel generator or a renewable energy power generator), and/or a power storage device (e.g., a battery). Although three power sources 110 are shown in FIG. 1, the transfer switch system 100 can be utilized in connection between two and N number of power sources 110 in other examples.

Each power source 110 is connectable to the transfer mechanism 150 via the second stage relay 144 and a respective one of the first stage relays 140. The first-stage relays 140 and the second-stage relay 144 are actuatable to selectively connect one of the power sources 110 to the transfer mechanism 150, as will be described in detail below. The transfer mechanism 150 can include one or more electromechanical contactors, solid state devices, circuit breaker devices, and/or other suitable devices for electric power transfer. In one example, the transfer mechanism 150 includes a solenoid that causes an electrical contact to selectively connect to one of multiple contacts, each corresponding to a respective one of the power sources 110. Other examples are also possible.

Each power source 110 is further connected to the voltage source analyzer 120. The voltage source analyzer 120 senses the electrical signals provided by the power sources 110 and outputs power data indicative of one or more parameters sensed for the electrical signals. In an example, the power data may relate to an amplitude, a magnitude, a frequency, and/or a phase of a voltage and/or a current of the electrical signal provided by each power source 110. The voltage source analyzer 120 may thus include one or more voltage sensing circuits (e.g., including a Hall Effect sensor). The voltage source analyzer 120 provides the power data to the source select module 130.

The source select module 130 also receives an input from the transfer request module 132. In particular, the source select module 130 may receive a transfer request input, which indicates that the transfer mechanism 150 will be actuated to transfer a load from one power source 110 to another. The transfer request input may further indicate which of the power sources 110 is currently connected to the load and which of the power sources 110 will be connected to the load after the transfer mechanism is actuated. In one example, the transfer request input can be provided from the transfer request module 132 to the source select module 130 responsive to an operator manually initiating the request (e.g., by throwing a switch, pushing a button, etc.). Additionally or alternatively, for example, the transfer request input can be automatically provided by a controller (not shown) of the transfer switch system 100 responsive to the controller determining that the currently connected power source 110 is experiencing an issue (e.g., an overload, an outage, etc.). In some examples, the transfer request provided by the transfer request module 132 may indicate a condition detected by the controller, which caused the controller to initiate the power source transfer (e.g., an overload, an outage, etc.).

Responsive to the source select module 130 receiving a transfer request from the transfer request module 132, the source select module 130 analyzes the power data received from the voltage source analyzer 120 to select one of the power sources 110 for powering the transfer mechanism 150 during actuation of the transfer mechanism 150 (i.e., to transfer a load from one power source 110 to another). In particular, the source select module 130 analyzes the power data provided by the voltage source analyzer 120 to determine which of the power sources 110 has sufficient power to operate the transfer mechanism 150. In one example, the source select module 130 can do so by determining, based on the power data, which of the power sources 110 are providing a voltage signal having power greater than a threshold value. In an implementation, the threshold value can be a minimum power that is required to actuate the transfer mechanism 150. Different threshold values can be used in additional or alternative examples. Further, in additional or alternative aspects, the source select module 130 can determine which power sources 110 have power greater than the threshold based on an amplitude, a magnitude, a frequency, and/or a phase indicated by the power data (e.g., by comparing such parameter(s) to corresponding thresholds).

If only one of the power sources 110 has power greater than the threshold value, the source select module 130 selects that power source 110 and then controls the relays 140, 144 to cause the selected power source 110 to provide power to the transfer mechanism 150 as described below. On the other hand, if the source select module 130 determines that more than one of the power sources 110 has sufficient power to actuate the transfer mechanism 150, the source select module 130 can access the preferred source module 134 to retrieve preference data and then select one of the power sources 110 based at least in part on the retrieved preference data. The preference data can thus indicate which of the power sources 110 should be used to power the transfer mechanism 150. In one example, the preference data can indicate single preferred power source 110. In another example, the preference data can indicate a hierarchical list of power sources 110 that applies to all situations. In such an example, the source select module 130 can select the power source 110 to use for powering the transfer mechanism 150 by determining which of the power sources 110 having sufficient power (e.g., at least a threshold power) is highest on the list and then selecting that power source 110.

In yet another example, the preference data can indicate which of the power sources 110 to use based on one or more factors. For example, the preference data may take into consideration the type of load that is powered by the system, which power source 110 is currently powering the load, which power source 110 will be powering the load after the transfer mechanism 150 is actuated, whether the transfer request was manually or automatically initiated, what conditions caused the transfer request to be initiated (e.g., an overload situation versus a power loss situation), and/or metrics relating to the power data (e.g., a stability of the power source over a period of time).

In some implementations, the preference data can be manually input into the preferred source module 134 via a user input device. In one example, the preferred source select 134 can include a dipswitch with number of positions that correspond to the number of power sources 110 connected to the transfer device 100 and the user may indicate a preference for each power source 110 based on the position of the dipswitch corresponding to that power source 110. In other examples, the preference data can be programmed into the source preference module 134 by other types of input devices (e.g., a keyboard, a button pad, a mouse, etc.) and/or the preference data can provided or downloaded via a communications interface. In still other examples, the preference data can be programmed into the source preference module 134 at the time of manufacture.

As noted above, the source select module 130 selects one of the power sources 110 and then causes the relays 140, 144 to connect the selected power source 110 to the transfer mechanism 150. For example, the source select module 130 can provide control signals to controllers 142 of the first stage relays 140 and/or the second stage relay 144 to control whether the relays 140, 144 connect or disconnect the power sources 110 with the transfer mechanism 150. Although the example of FIG. 1 includes relays 140, 144 for controlling which power source 110 is connected to the transfer mechanism 150, other types of switching devices can be utilized in other examples.

According to aspects of the present disclosure, the relays 140, 144 can be configured to protect against arc through, short-circuits, and/or other faults. For example, the first stage relays 140 can be gap relays having a gap size that mitigates (or avoids) arcing at operation up to 600 V. In an implementation, the gap may be approximately 3 millimeters.

Additionally, for example, the second stage relay 144 can be a double pole double throw relay, which acts as a failsafe against shorting the power sources 110. In this arrangement, even if there is a failure that causes multiple first stage relays 140 to pass through power from the power sources 110, the second stage relay can only connect to one of the power sources 110 at a time. This ensures that it is not physically possible to short the power sources 110.

The transfer switch system 100 may thus facilitate operating the transfer mechanism 150 in a variety of scenarios. In some scenarios, the transfer switch 100 can transfer a load from a first power source to a second power source by providing power to the transfer mechanism 150 using a power source different from the second power source (to which the load is being transferred). For example, the transfer switch 100 can transfer the load from an active power source to an inactive power source by powering the transfer mechanism 150 using the active power source (i.e., the power source from which the load is being transferred). This may beneficially facilitate operating the transfer switch 100 for load shedding and/or maintenance purposes. In other scenarios, the transfer switch 100 can transfer the load from a first power source to a second power source by powering the transfer mechanism 150 using the second power source (i.e., the power source to which the load is being transferred).

According to some aspects of the present disclosure, the transfer switch 100 may analyze the electrical signals, provide power data, and select a power source from among multiple power sources in real-time. In this way, the transfer switch 100 may rapidly carry out a transfer of the load between power sources responsive to a transfer request.

Figure 2:
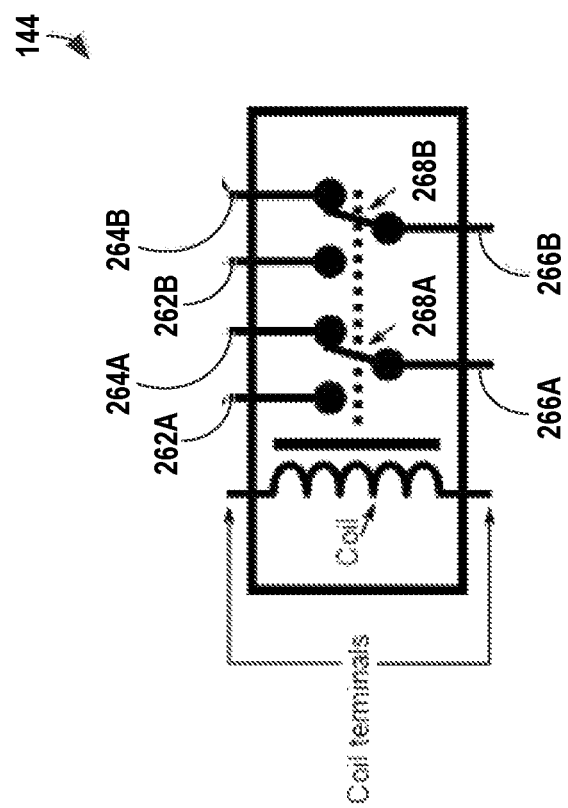
FIG. 2 is a block diagram representing an example second stage relay for the transfer switch of FIG. 1.

FIG. 2 is a block diagram representing an example second stage relay 144 according to an example. As shown in FIG. 2, the second stage relay 144 is a double pole double switch relay. As such, the second stage relay 244 includes a plurality of inputs 262A, 262B, 264A, 264B, two outputs 266A, 266B, and two switches 268A, 268B for selectively switching the outputs 266A, 266B between the inputs 262A-264B. In FIG. 2, a first input 262A and a second input 262B are coupled to a first power source, whereas a third input 264A and a fourth input 264B are coupled to a second power source. The outputs 266A and 266B are coupled to the transfer mechanism 150. As also shown in FIG. 2, the first switch 268A selectively couples the first output 266A to the first input 264A or the third input 266A, and the second switch 268B selectively couples the second output 266B to the second input 262B or the fourth input 264B. In this way, the switches 268A, 268B selectively switch the transfer mechanism 150 between the first and power sources 110.

Figure 3:
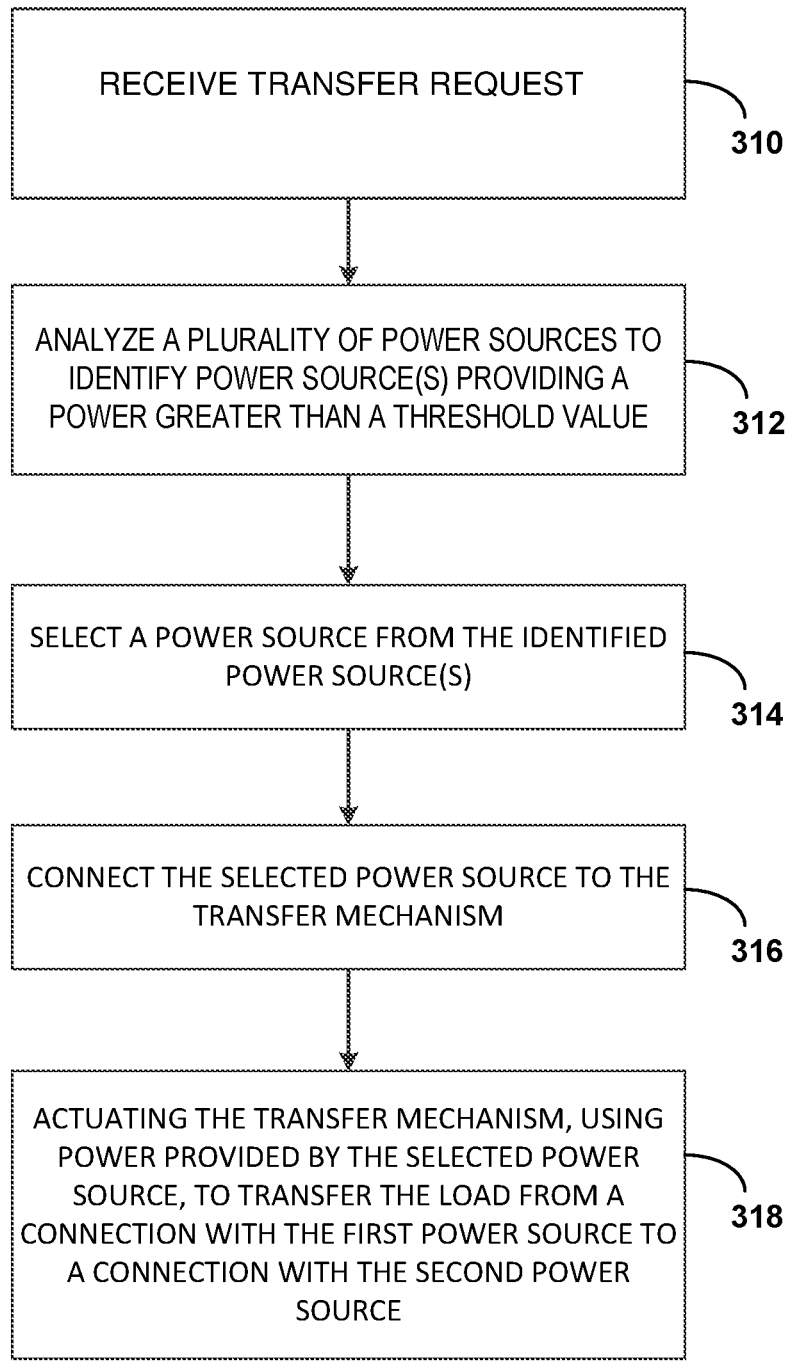
FIG. 3 is a flow chart of an example method for transferring load.

FIG. 3 is next a flow chart depicting an example set of operations that can be carried out in an implementation of a process in accordance with aspects of the present disclosure. At block 310, the method includes receiving a transfer request. At block 312, the method includes analyzing a plurality of power sources to identify one or more power sources providing a power greater than a threshold value. At block 314, the method includes selecting a power source from the identified one or more power sources providing power greater than the threshold value. At block 316, the method includes connecting the selected power source to a transfer mechanism. At block 318, the method includes actuating the transfer mechanism, using power provided to the transfer mechanism by the selected power source, to transfer the load from a connection with the first power source to a connection with the second power source.

Figure 4:
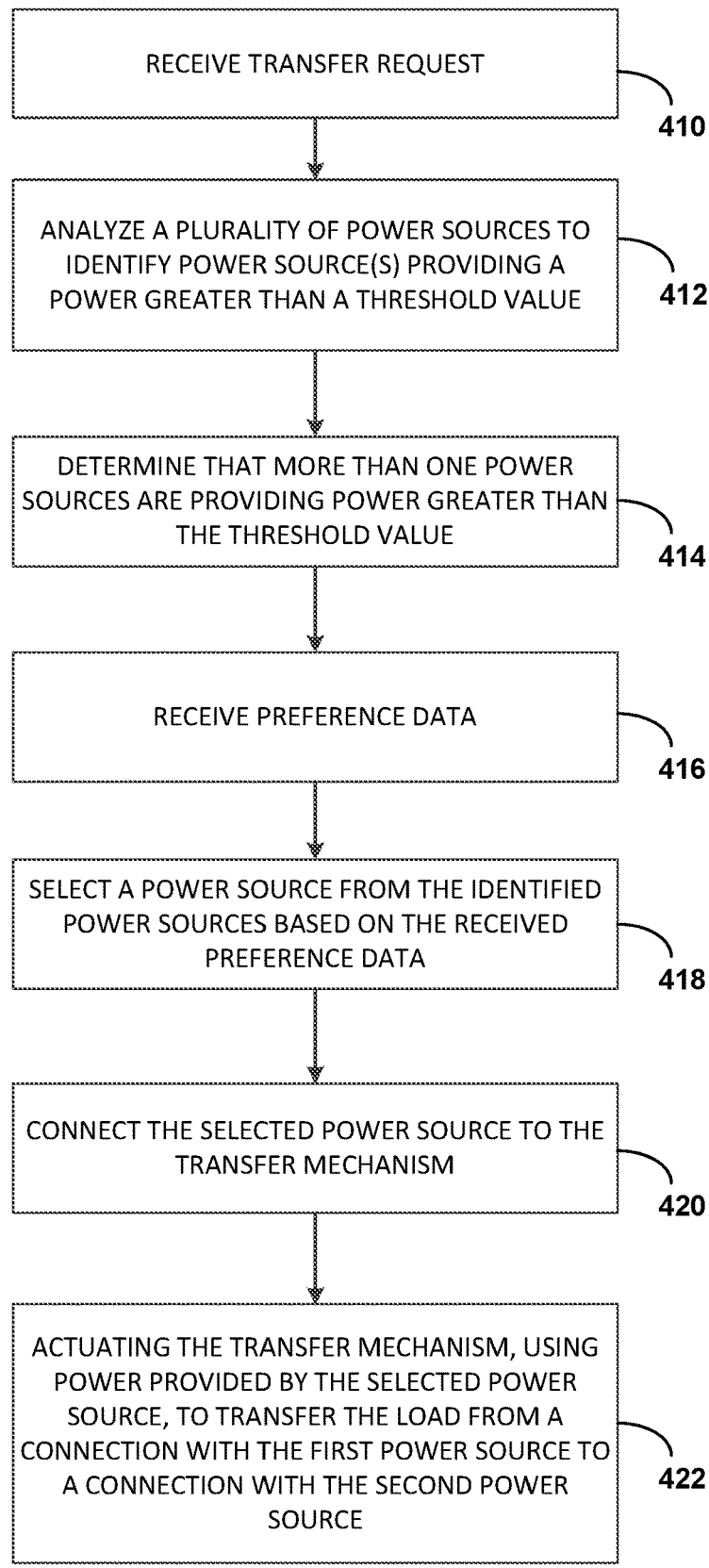
FIG. 4 is a flow chart of an example method for transferring load.

FIG. 4 is next a flow chart depicting an example set of operations that can be carried out in an implementation of a process in accordance with aspects of the present disclosure. At block 410, the method includes receiving a transfer request. At block 412, the method includes analyzing a plurality of power sources to identify one or more power sources providing a power greater than a threshold value. At block 414, the method includes determining that more than one of the power sources are providing power greater than the threshold value. At block 416, the method includes receiving preference data. At block 418, the method includes selecting a power source from the identified power sources based on the received preference data. The preference data indicates a preference for at least one of the plurality of power sources over at least another of the plurality of power sources. At block 420, the method includes connecting the selected power source to a transfer mechanism. At block 422, the method includes actuating the transfer mechanism, using power provided to the transfer mechanism by the selected power source, to transfer the load from a connection with the first power source to a connection with the second power source.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location. Additionally, although examples are described for an automatic transfer switch, the concepts described herein can be extended to a by-pass transfer switch.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method of transferring a load, comprising;
performing an analysis of a plurality of power sources to identify one or more power sources providing a power greater than a threshold value of power required to actuate a transfer mechanism;
storing preference data to indicate which of the power sources to use to power the transfer mechanism, wherein the preference data is stored in a preference data memory by downloading the preference data via a communications interface;

providing a transfer request input, the transfer request input indicating that the transfer mechanism is initiated to actuate a transfer of the load, the transfer request input further indicating which of the plurality of power sources is currently connected to the load and which of the plurality of power sources to connect to the load after the transfer mechanism is actuated;

selecting, in response to the transfer request input, and based on the analysis of the plurality of power sources and based on-the preference data, a power source from the identified one or more power sources providing power greater than the threshold value;

connecting the selected power source to the transfer mechanism to provide power to the transfer mechanism; and actuating the transfer mechanism, using the power provided to the transfer mechanism by the selected power source.

2. The method of claim 1, wherein the plurality of power sources includes first and second power sources and the first power source is an active power source providing power when connected to the load and the second power source is an inactive power source not providing power when connected to the load.

3. The method of claim 2, wherein the selected power source is the first power source.

4. The method of claim 1, wherein the preference data indicates which of the power sources to use to power the transfer mechanism for at least one of power continuity, load shedding, or maintenance purposes.

5. The method of claim 1, wherein the identified one or more power sources comprise more than two power sources, and wherein the selecting the power source from the identified more than two power sources is based on preference data, wherein the preference data indicates a preference for at least one of the plurality of power sources over at least another of the plurality of power sources.

6. The method of claim 1, wherein:
connecting the selected power source to the transfer mechanism provides power to the transfer mechanism to transfer the load from a connection with a first power source to a connection with a second power source, based on the analysis of the power sources and the preference data; and
actuating the transfer mechanism, using power provided to the transfer mechanism by the selected power source, actuates a first stage relay to connect the selected power source to a second stage relay; and
actuates the second stage relay to connect the selected power source to the transfer mechanism via the first stage relay and the second stage relay.

7. The method of claim 1, wherein:
actuating the transfer mechanism, using power provided to the transfer mechanism by the selected power source, transfers the load from a connection with a first power source to a connection with a second power source.

8. The method of claim 7, wherein the preference data indicates which of the power sources to use to power the transfer mechanism for at least one of power continuity, load shedding, or maintenance purposes.

9. The method of claim 1, wherein analyzing the plurality of power sources comprises:

sensing, via a voltage sensing module, a voltage signal for each of the plurality of power sources;
determining power data for each sensed voltage signal;
processing the power data to determine one or more of an amplitude, a magnitude, a phase, or a frequency of each sensed voltage signal;
comparing, on a per power source basis, the determined one or more of the amplitude, the magnitude, the phase, or the frequency to a threshold amplitude, a threshold phase, or a threshold frequency; and
identifying the one or more power sources based on the comparison.

10. A system for transferring a load, comprising:
a memory; and
a processing logic, operatively coupled to the memory, to:
analyze a plurality of power sources to identify one or more power sources providing a power greater than a threshold value of power required to actuate a transfer mechanism;
store preference data to indicate which of the power sources to use to power the transfer mechanism, wherein the preference data is stored in the memory by downloading the preference data via a communications interface of the system;
provide a transfer request input, the transfer request input indicating that the transfer mechanism is initiated to actuate a transfer of the load, the transfer request input further indicating which of the plurality of power sources is currently connected to the load and which of the plurality of power sources to connect to the load after the transfer mechanism is actuated;
select, in response to the transfer request input, and based on the analysis of the plurality of power sources and based on-the preference data, a power source from the identified one or more power sources providing power greater than the threshold value;
connect the selected power source to the transfer mechanism to provide power to the transfer mechanism; and
actuate the transfer mechanism, using the power provided to the transfer mechanism by the selected power source.

11. The system of claim 10, wherein the first power source is an active power source providing power when connected to the load and the second power source is an inactive power source not providing power when connected to the load.

12. The system of claim 11, wherein the selected power source is the first power source.

13. The system of claim 10, wherein the preference data indicates which of the power sources to use to power the transfer mechanism for at least one of power continuity, load shedding, or maintenance purposes.

14. The system of claim 10, wherein the identified one or more power sources comprise more than two power sources, and wherein the selecting the power source from the identified more than two power sources is based on preference data, wherein the preference data indicates a preference for at least one of the plurality of power sources over at least another of the plurality of power sources.

15. The system of claim 10, wherein the processing logic operates to:
connect the selected power source to the transfer mechanism to provide power to the transfer mechanism to transfer the load from a connection with a first power source to a connection with a second power source, based on the analysis of the power sources and the preference data;

actuate the transfer mechanism, using the power provided to the transfer mechanism by the selected power source, by actuating a first stage relay to connect the selected power source to a second stage relay; and actuating the second stage relay to connect the selected power source to the transfer mechanism via the first stage relay and the second stage relay.

16. The system of claim 10, wherein the processing logic operates to:

actuate the transfer mechanism, using power provided to the transfer mechanism by the selected power source, to transfer the load from a connection with a first power source to a connection with a second power source.

17. The system of claim 16, wherein the preference data indicates which of the power sources to use to power the transfer mechanism for at least one of power continuity, load shedding, or maintenance purposes.

18. The system of claim 10, wherein the processing logic operates to analyze the plurality of power sources by:

sensing, via a voltage sensing module, a voltage signal for each of the plurality of power sources;

determining power data for each sensed voltage signal;

processing the power data to determine one or more of an amplitude, a magnitude, a phase, or a frequency of each sensed voltage signal;

comparing, on a per power source basis, the determined one or more of the amplitude, the magnitude, the phase, or the frequency to a threshold amplitude, a threshold phase, or a threshold frequency; and identifying the one or more power sources based on the comparison.

19. A transfer switch for selectively transferring power from a plurality of power sources to or from an electrical load, the transfer switch comprising:

a power source analyzer configured to analyze a plurality of power sources and determine power data based on the analysis of power sources of the plurality of power sources, to identify, based on the power data, one or more of the plurality of power sources providing a power greater than a threshold value of power required to actuate a transfer mechanism;

a memory configured to store preference data to indicate which of the power sources to use to power the transfer mechanism for power continuity, load shedding, or maintenance purposes, wherein the preference data is stored in the memory by downloading the preference data via a communications interface of the transfer switch;

a transfer request module configured to provide a transfer request input, the transfer request input indicating that the transfer mechanism is initiated to actuate a transfer of the load, the transfer request input further indicating which of the plurality of power sources is currently connected to the load and which of the plurality of power sources to connect to the load after the transfer mechanism is actuated;

a source select module connected to receive the transfer request input provided by the transfer request module and connected to the power source analyzer to receive the power data from the power source analyzer, the source select module configured to select, in response to the transfer request input, and based on the analysis by the power source analyzer of the plurality of power sources and based on the preference data, a power source from the identified one or more power sources providing power greater than the threshold value; and a source select relay connected to the source select module, the source select relay connecting the selected power source to the transfer mechanism to actuate the transfer mechanism upon receipt of a control signal from the source select module.

20. The transfer switch of claim 19, further comprising the transfer mechanism:

wherein the transfer mechanism is configured to selectively connect individual power sources of the plurality of power sources to the load; and wherein the preference data indicates which of the power sources to use to power the transfer mechanism for at least one of power continuity, load shedding, or maintenance purposes.

21. The transfer switch of claim 19, wherein the preference data indicates which of the power sources to use to power the transfer mechanism based on a type of load that is powered and/or whether a transfer request was due to an overload situation versus a power loss situation.

* * * * *